US005749305A

United States Patent [19]
Jacovelli

[11] Patent Number: 5,749,305
[45] Date of Patent: May 12, 1998

[54] TRAY FOR USE IN AUTOMOBILES

[76] Inventor: Matthew George Jacovelli, P.O. Box 152, Cedarbrook, N.J. 08018

[21] Appl. No.: 682,917

[22] Filed: Jul. 16, 1996

[51] Int. Cl.$^6$ ........................................... A47B 23/00
[52] U.S. Cl. ................................. 108/44; 248/441.1
[58] Field of Search ................ 108/44, 47; 248/441.1, 248/447.2, 450; D6/406

[56] References Cited

U.S. PATENT DOCUMENTS

| | | | |
|---|---|---|---|
| D. 257,589 | 12/1980 | Shaffert . | |
| D. 292,445 | 10/1987 | Judge . | |
| D. 358,612 | 5/1995 | Smith . | |
| 2,866,381 | 12/1958 | Aldredge | 108/44 X |
| 4,749,161 | 6/1988 | Falcone | 108/44 X |
| 4,805,867 | 2/1989 | McAllister | 108/44 |
| 4,915,035 | 4/1990 | Clark et al. | 108/44 |
| 4,974,805 | 12/1990 | Douglas | 108/44 X |
| 5,060,581 | 10/1991 | Malinski | 108/44 |
| 5,386,785 | 2/1995 | Naor | 108/44 |
| 5,413,035 | 5/1995 | Fernandez | 108/44 |
| 5,487,521 | 1/1996 | Callahan | 108/44 |

FOREIGN PATENT DOCUMENTS

| | | | |
|---|---|---|---|
| 1232973 | 10/1960 | France . | |
| 1 550 899 | 8/1979 | United Kingdom | 108/44 |
| 2 144 627 | 3/1985 | United Kingdom . | |

*Primary Examiner*—Ramon O. Ramirez
*Attorney, Agent, or Firm*—Richard C. Litman

[57] ABSTRACT

A tray that may be attached to the steering wheel of a motor vehicle. It can serve to hold food and beverage, as a reading and writing desk, to hold a laptop computer, as a promotional item with advertising printed on the tray, etc. The tray has a flat upper surface, a flat lower surface, and an outside edge with rounded corners. There is a circular hole which may be used to hold beverage containers. There is an elongated hole with straight parallel sides and rounded ends, through which the lower part of the steering wheel can fit. An attachment tab retains the tray on the steering wheel. The attachment tab is connected to the tray by a pivot, and can be turned ninety degrees from a first position in which it retains the tray on the steering wheel, to a second position in which it releases the tray from the steering wheel. A depression in the tab's upper surface makes it easier to move the tab with one finger. When the tab is in the second position, an indentation in a side of the elongated hole allows access to the depression. In the lower surface of the tray, there is a rear recess into which the tab fits when in the second position, and a front recess into which the outward end of the tab fits when in the first position, or when moving between the first and second position.

20 Claims, 3 Drawing Sheets

TRAY FOR USE IN AUTOMOBILES

BACKGROUND OF THE INVENTION

1. Field of the Invention

The present invention relates to a tray that can be attached to the steering wheel of a car or truck for dining, writing, or other purposes.

2. Description of the Prior Art

Busy people will often find it convenient if they have an easy and comfortable means of eating a meal, consuming a beverage, or doing office work or other chores while they are parked in their car or truck. The present invention provides a flat surface for these and other purposes, that can easily be securely attached to a motor vehicle's steering wheel, and just as easily be removed when it is not needed. While there are numerous inventions for automobile trays in the prior art, it will be seen that none are equivalent to the present invention.

U.S. Pat. No. 4,749,161, issued on Jun. 7, 1988, to Gus Falcone, discloses an automobile steering wheel table, having four sections connected by hinges: two rectangular sections cover the steering wheel to form a sloped surface, a triangular section hangs from the side of one of the rectangular sections, and is also attached to a third, smaller rectangular section that forms a level surface at one side of the steering wheel, with recesses in which various items may be retained. The instant invention is distinguishable, in that it is retained on the steering wheel by fitting through it rather than by covering it, and it is formed in one piece, except for an attachment tab.

U.S. Pat. No. 4,805,867, issued on Feb. 21, 1989, to Bruce E. McAllister, discloses a steering wheel platform, with two slots that are open at opposite edges of the board. The instant invention is distinguishable, in that it has a single slot, that is closed, with no opening to an edge of the tray, with an attachment tab that is pivotally connected to the tray.

U.S. Pat. No. 4,915,035, issued on Apr. 10, 1990, to Bobby D. Clark and Shirley J. McMillan, discloses an automobile food service tray, which is supported on the steering wheel by two slidable right angle frames. The instant invention is distinguished by having only one pivotally moving part, i.e., the attachment tab, rather than two sliding frames.

U.S. Pat. No. 5,060,581, issued on Oct. 29, 1991, to Carole S. Malinski, discloses a steering wheel tray apparatus, with two pivotally connected panels, with straps by which their relative angle can be adjusted, with the edge between the panels fitting inside the steering wheel. The instant invention is distinguishable, in that it has only one main piece, and the edges of its tray can be wider apart than the diameter of the steering wheel.

U.S. Pat. No. 5,413,035, issued on May 9, 1995, to Eugene Fernandez, discloses a steering wheel supported tray, with two pivotally connected pieces, one of which is designed to fit over the steering wheel of an automobile, and the other can serve as a tray for food or as a desk. The instant invention can be distinguished, as it has only one main piece, and it fits through rather than over the steering wheel.

U.S. Pat. No. 5,487,521, issued on Jan. 30, 1996, to Jack D. Callahan, discloses a steering wheel mounted support, comprised of an upper clipboard to be retained on a steering wheel, and an angularly adjustable tray that can hold a computer, printed matter, or food and beverage. The instant invention is distinguishable, in that it has only one main piece, with a pivotally connected attachment tab.

U.S. Pat. No. Des. 257,589, issued on Dec. 2, 1980, to Robert W. Shaffert, discloses a design for a steering wheel desk, with a flat front surface, and a rear surface with a curved recess by which the desk can be retained on a steering wheel. The instant invention is distinguishable, in that it has a slot that the steering wheel can pass part way through, with a pivotally connected attachment tab.

U.S. Pat. No. Des. 292,445, issued on Oct. 27, 1987, to Andrew Judge, discloses a design for a vehicle steering wheel tray, with two main parts: a rounded part to fit over the steering wheel, and a rectangular part to be used as a tray. The instant invention is distinguishable, in that it has only one main part.

U.S. Pat. No. Des. 358,612, issued on May 23, 1995, to Alan L. Smith, discloses a design for a pliable, book-holding platform, for attachment to a vehicle steering wheel, with four corners that fit over the steering wheel, rather than a slot that the steering wheel can pass partially through, as in the instant invention.

French Patent No. 1.232.973, published Oct. 12, 1960, discloses a table for attachment to an automobile steering wheel, with two notches by which it is retain on opposite sides of the wheel, rather than a single slot, as in the instant invention.

British Patent No. 1 550 899, complete specification published Aug. 22, 1979, discloses a demountable shelf structure, with two pivotally attached main parts: a mounting panel attached over an automobile's steering wheel, and a shelf. The instant invention is distinguishable, in that it has only one main part.

British Patent No. 2 144 627, published Mar. 13, 1985, discloses a one or two piece tray for use in a motor vehicle, having a curved section designed to fit over a steering wheel, and a support surface for eating or writing, etc. It does not have the slot through which the steering wheel can partially pass, as in the instant invention.

None of the above inventions and patents, taken either singly or in combination, is seen to describe the instant invention as claimed.

SUMMARY OF THE INVENTION

The present invention is a tray that may be attached to the steering wheel of a motor vehicle. It can serve to hold food and beverage, as a reading and writing desk, to hold a laptop computer, as a promotional item with advertising printed on the tray, etc. The tray has a flat upper surface, a lower surface that may be flat or hollowed out, and an outside edge with rounded corners. There is a circular hole which may be used to hold beverage containers. There is an elongated hole with straight parallel sides and rounded ends, through which the lower part of the steering wheel can fit. An attachment tab retains the tray on the steering wheel. The attachment tab is connected to the tray by a pivot, and can be turned ninety degrees from a first position in which it retains the tray on the steering wheel, to a second position in which it releases the tray from the steering wheel. An advertisement or other design may be placed on the upper surface of the tray.

Accordingly, it is a principal object of the invention to provide a tray that can be easily attached and detached from an automobile's steering wheel.

It is another object of the invention to provide a tray that can be conveniently used to hold food and beverage inside a motor vehicle.

It is a further object of the invention to provide a tray that can conveniently serve as a surface for reading and writing, or for holding a laptop computer, in a motor vehicle.

Still another object of the invention is to provide a tray for use in an automobile that can serve as an advertising medium.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a tray that may be attached to the steering wheel of a motor vehicle. It can serve to hold food and beverage, as a reading and writing desk, to hold a laptop computer, as a promotional item with advertising printed on the tray, etc.

Figure 1:
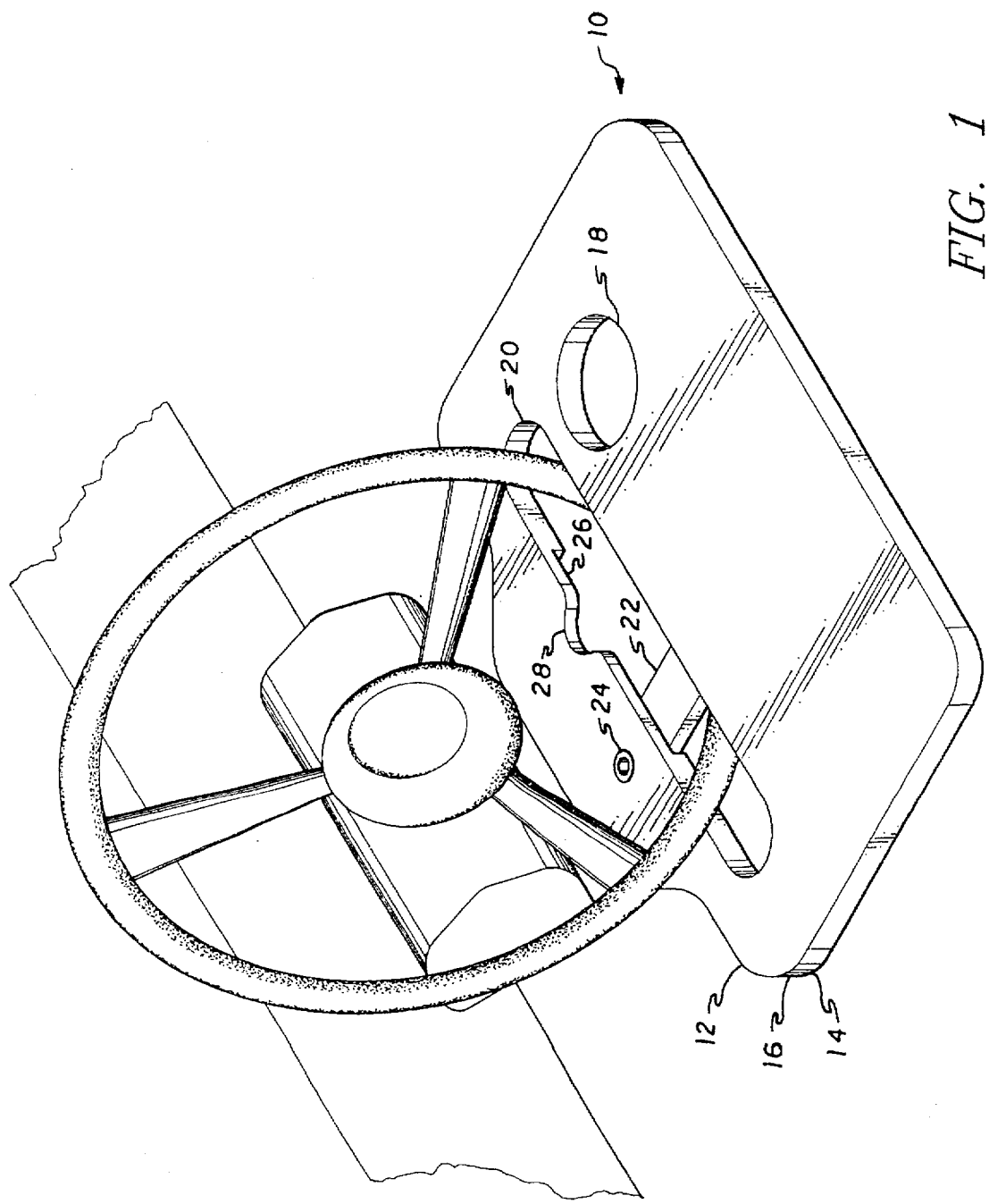
FIG. 1 is a perspective environmental view of the invention, showing its attachment to an automobile's steering wheel.

FIG. 1 is a perspective environmental view of the invention 10, showing its attachment to an automobile's steering wheel (which is not part of the claimed invention). The tray has a flat upper surface 12, a lower surface 14 which may be flat or hollowed out, and an outside edge 16 with rounded corners. There is a circular hole 18 which may be used to hold beverage containers. There is an elongated hole 20 with straight parallel sides and rounded ends, through which the lower part of the steering wheel can fit. An attachment tab 22 retains the tray on the steering wheel. The attachment tab is connected to the tray by the pivot 24, and can be turned ninety degrees from the position shown into rear recess 26 in the lower surface, to release the tray from the steering wheel. Indentation 28 above the recess makes it easier to move the attachment tab back out again.

Figure 2:
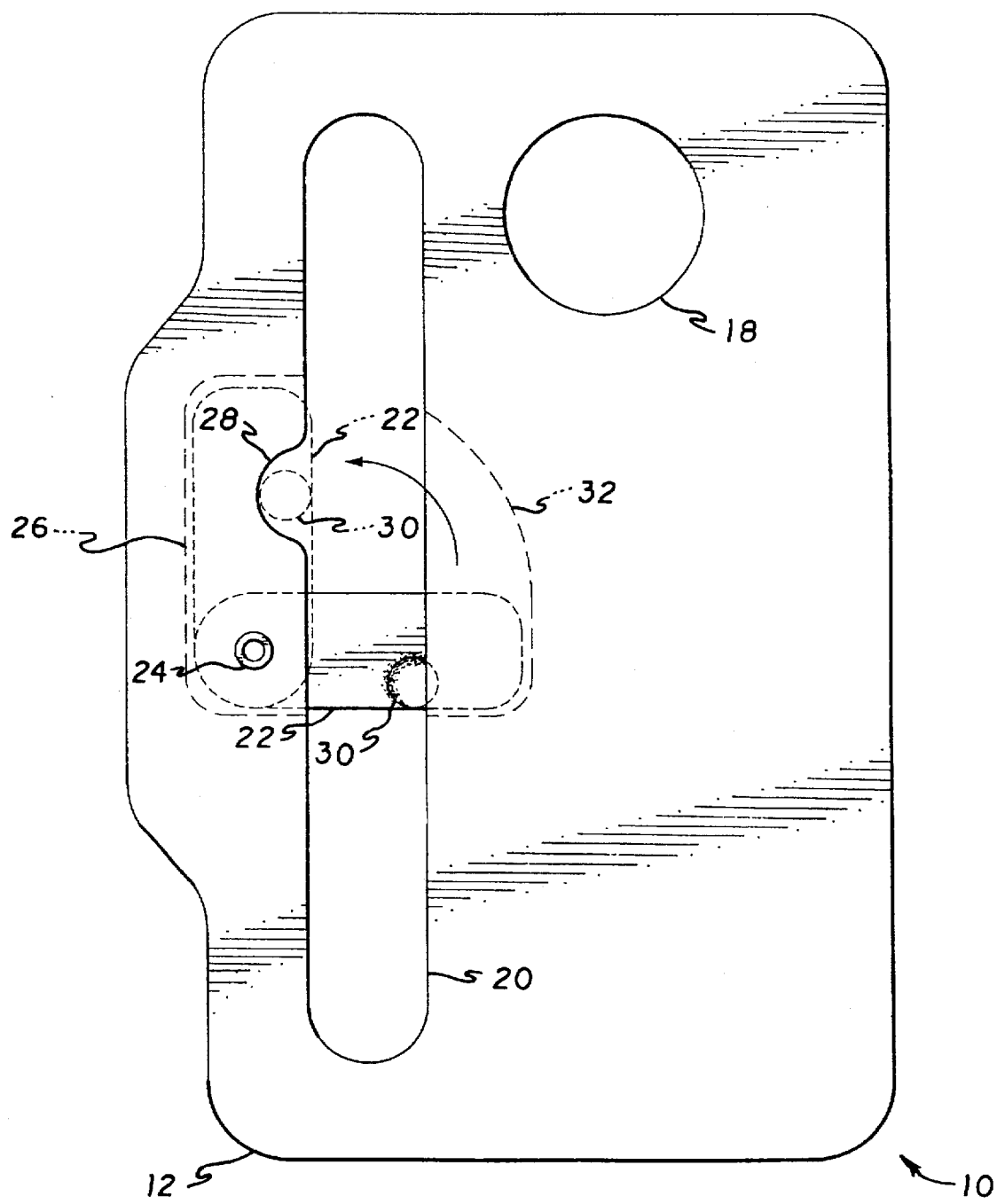
FIG. 2 is a top plan view of the invention, showing movement of the attachment tab from a closed position to an open position.

FIG. 2 is a top view of the invention 10, showing the top surface 12 of the tray, and the movement of the attachment tab 22 from a first position (solid lines) in which it retains the tray on the steering wheel, to a second position (broken lines) in which it releases the tray from the steering wheel. A depression 30 makes it easier to move the tab with one finger. It can be seen that even when the tab is in the second position, the indentation 28 allows access to the depression. In addition to the rear recess 26 into which the tab fits when in the second position, there is a front recess 32 on the opposite side of the elongated hole into which the outward end of the tab fits when in the first position, or when moving between the first and second positions. (The edges of both recesses are shown in broken lines in FIG. 2, because they are in the lower surface.)

Figure 3:
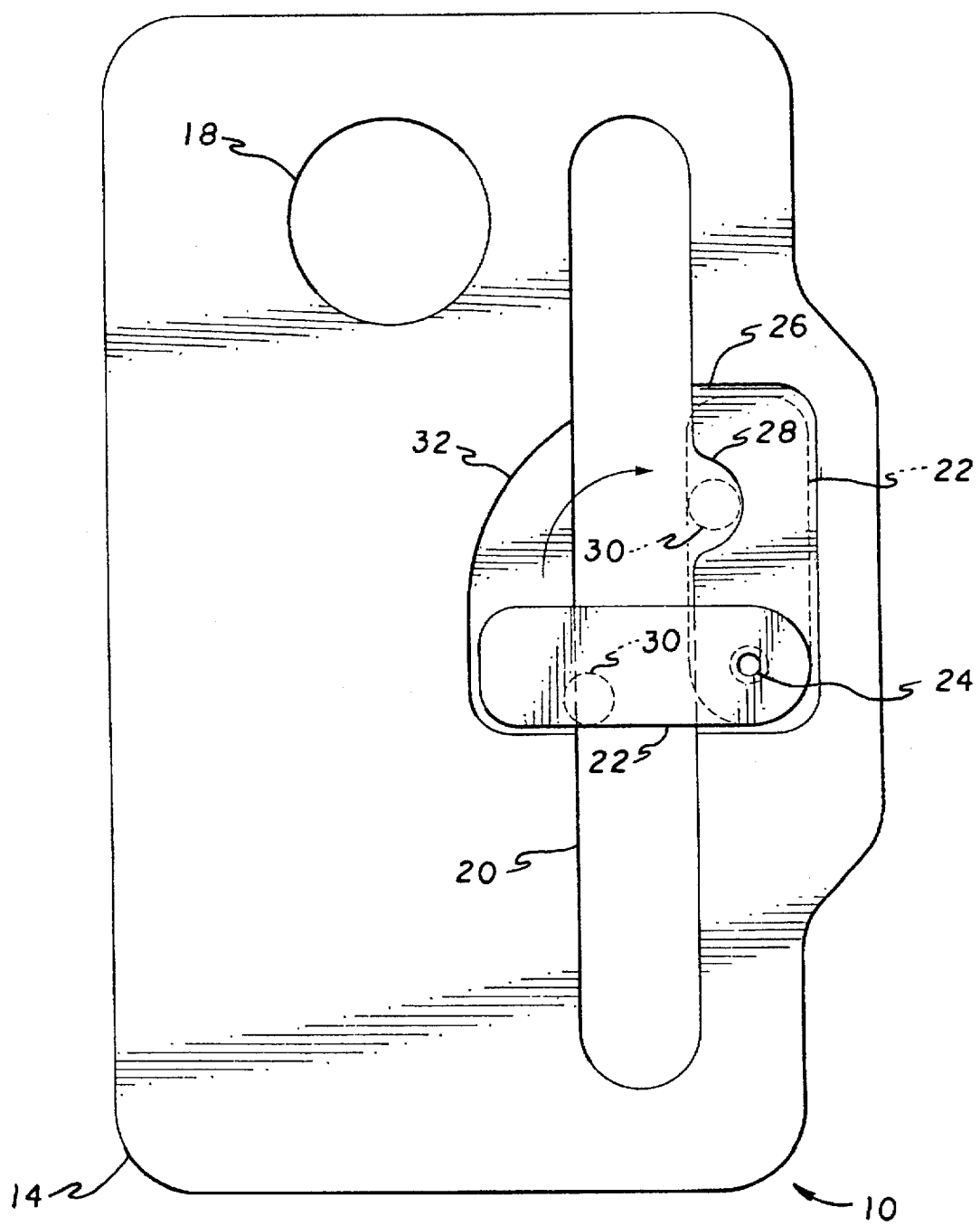
FIG. 3 is a bottom plan view of the invention, showing movement of the attachment tab from a closed position to an open position.

FIG. 3 is a bottom view of the invention 10, showing the bottom surface 14 of the tray, and again showing movement of the attachment tab 22 from a first position (solid lines) to a second position (broken lines). Front recess 32 and rear recess 26 are now shown in solid lines, as they are in the bottom surface. Depression 30 is showing in broken lines, because it is on the top surface of the attachment tab. The bottom surface is shown as being flat, but alternatively, it may be hollowed out or have some other shape.

The tray and attachment tab are preferably made from plastic. The pivot is preferably made from stainless steel or other metal. All parts of the invention may be made from recycled materials. The upper surface of the tray may be roughened, to increase friction and thus prevent objects from sliding off the tray. An advertising message or other design may be printed on or embedded in the upper surface of the tray.

It is to be understood that the present invention is not limited to the sole embodiment described above, but encompasses any and all embodiments within the scope of the following claims.

I claim:

1. An automobile tray comprising:
    a tray with an upper surface, a lower surface, and an outside edge;
    an elongated hole in the tray, between the upper surface and the lower surface, with an inside edge that does not contact the outside edge; and
    an attachment tab that is connected to the tray, and can be moved between a first position in which it crosses the elongated hole, and a second position in which it does not cross the elongated hole.

2. The automobile tray according to claim 1, wherein the attachment tab has a first end and a second end, with the first end pivotally connected to the tray.

3. The automobile tray according to claim 2, wherein the attachment tab contacts the lower surface of the tray.

4. The automobile tray according to claim 3, wherein there is:
    a first recess in the lower surface of the tray, on one side of the elongated hole, within which the first end of the attachment tab fits when it is in the first position, and within which the entire attachment tab fits when it is in the second position; and
    a second recess in the lower surface of tray, on an opposite side of the elongated hole from the first recess, within which second end of the attachment tab fits when it is in the first position, with the second recess having a curved portion through which the second end can pass when the tab is moving between the first and second positions.

5. The automobile tray according to claim 4, wherein the upper surface and the lower surface of the tray are flat and parallel.

6. The automobile tray according to claim 5, wherein the upper surface of the tray is roughened to increase friction and reduce slippage of objects that may be placed on the tray.

7. The automobile tray according to claim 6, wherein there is a circular hole in the tray, between the upper surface and the lower surface, with a circular edge that does not contact either the outside edge of the tray or the inside edge of the elongated hole.

8. The automobile tray according to claim 7, wherein the attachment tab has an upper surface and a lower surface, with a depression in the upper surface at its second end, whereby a user can move the attachment tab between the first and second position with a finger.

9. The automobile tray according to claim 8, wherein the elongated hole has two parallel straight sides and two rounded ends, except that in one of the sides there is an indentation above where the depression in the attachment tab is in the second position, whereby access to the depression is alllowed so that the tab can be moved.

10. The automobile tray according to claim 9, wherein the tray is rectangular, except for rounded corners and a rear extension.

11. The automobile tray according to claim 10, wherein symbols are visible on the upper surface of the tray.

12. The automobile tray according to claim 10, wherein the tray is made of plastic.

13. The automobile tray according to claim 12, wherein the plastic is a recycled plastic material.

14. The automobile tray according to claim 10, wherein the attachment tab is connected to the tray by a metal pivot.

15. The automobile tray according to claim 14, wherein the metal pivot is fabricated of a recycled material.

16. The automobile tray according to claim 4, wherein the upper surface of the tray is flat, and the lower surface of the tray is hollowed out.

17. The automobile tray according to claim 16, wherein the upper surface of the tray is roughened to increase friction and reduce slippage of objects that may be placed on the tray.

18. The automobile tray according to claim 17, wherein there is a circular hole in the tray, between the upper surface and the lower surface, with a circular edge that does not contact either the outside edge of the tray or the inside edge of the elongated hole.

19. The automobile tray according to claim 18, wherein the attachment tab has an upper surface and a lower surface, with a depression in the upper surface at its second end, whereby a user can move the attachment tab between the first and second position with a finger.

20. The automobile tray according to claim 19, wherein the elongated hole has two parallel straight sides and two rounded ends, except that in one of the sides there is an indentation above where the depression in the attachment tab is in the second position, whereby access to the depression is allowed so that the tab can be moved.

* * * * *